United States Patent [19]
Strauff

[11] 3,978,770
[45] Sept. 7, 1976

[54] PRESSURE FOLLOW-UP CONTROL MEANS FOR SERVO-STEERING SYSTEMS, AND THE LIKE

[75] Inventor: Günther Strauff, Kaarst, Germany

[73] Assignee: Langen & Co., Duesseldorf, Germany

[22] Filed: Dec. 2, 1974

[21] Appl. No.: 528,775

[30] Foreign Application Priority Data
Dec. 13, 1973 Germany............................ 2361893
Apr. 9, 1974 Germany............................ 2417194

[52] U.S. Cl. .............................. 91/372; 91/375 R; 91/434
[51] Int. Cl.² ......................................... F15B 9/10
[58] Field of Search ............ 91/372, 434, 464, 465, 91/370, 371, 373, 375 R, 375 A

[56] References Cited
UNITED STATES PATENTS

| | | | |
|---|---|---|---|
| 2,231,583 | 2/1941 | Konig.............................. | 91/464 X |
| 2,763,159 | 9/1956 | Barth .................................. | 91/372 |
| 2,930,357 | 3/1960 | Brueder ........................... | 91/465 X |
| 3,298,316 | 1/1967 | Budzich ............................ | 91/371 |
| 3,460,440 | 8/1969 | Brent ................................ | 91/464 X |
| 3,698,415 | 10/1972 | Forster............................ | 91/434 X |
| 3,855,904 | 12/1974 | Jablonsky ....................... | 91/372 X |

FOREIGN PATENTS OR APPLICATIONS
2,127,762 12/1972 Germany ............................ 91/370

Primary Examiner—Alan Cohan
Assistant Examiner—Abraham Hershkovitz
Attorney, Agent, or Firm—Holman & Stern

[57] ABSTRACT

The springs associated with the control valves of a servo steering system are prestressed at least in that position of the valves where associated connections are blocked. Further, the springs are arranged supporting themselves in the valve by ends of the springs being arranged facing an activating member common to the valve and permitting the entire spring force to be received by the activating member alone. At least one component of each spring is supported by the valve housing, whereby the bias on the one component increases, based on the activating force limit during a reduction of the activating force, and reaches a maximum when power-flow between the activating member and the associated regulating spring is interrupted.

16 Claims, 10 Drawing Figures

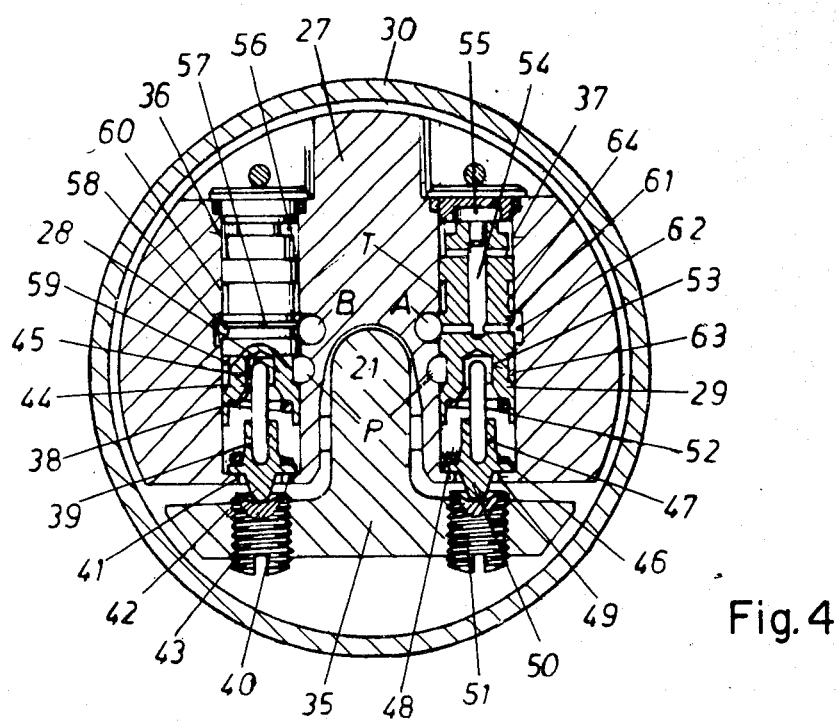
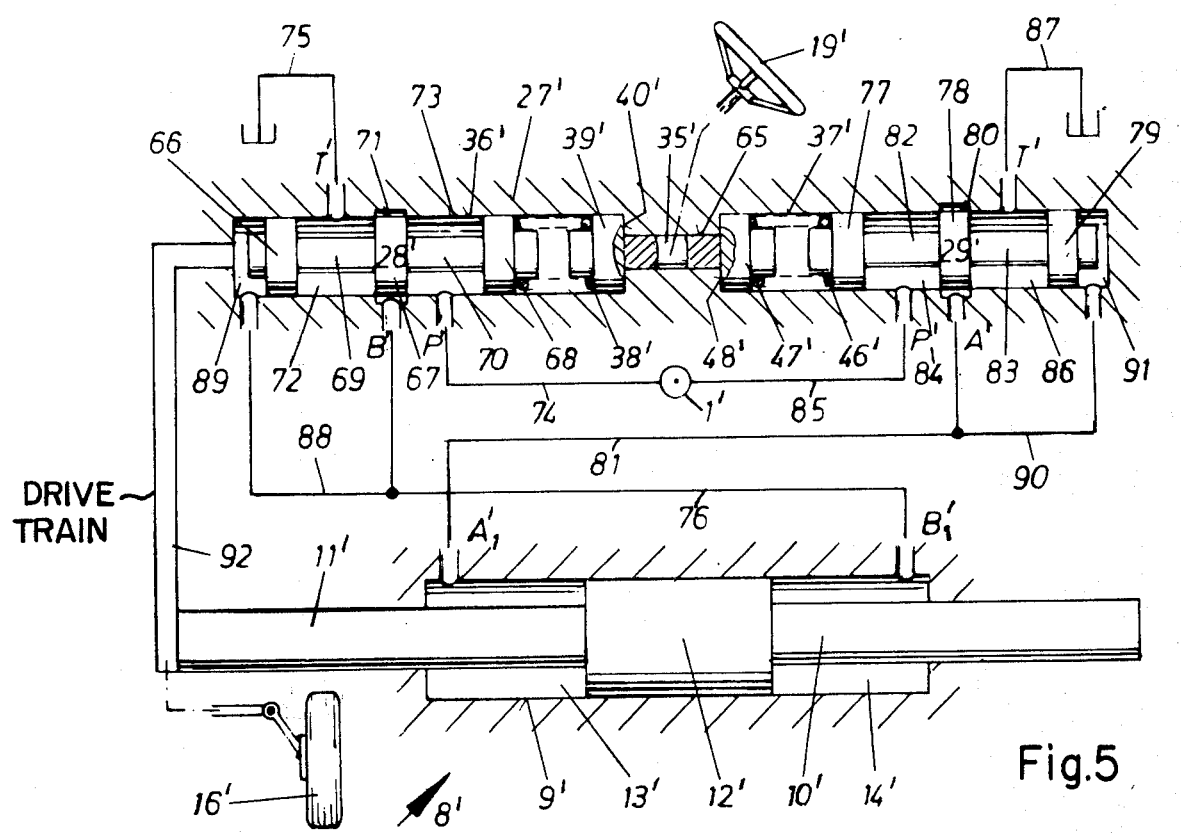
Fig. 4
Fig. 5

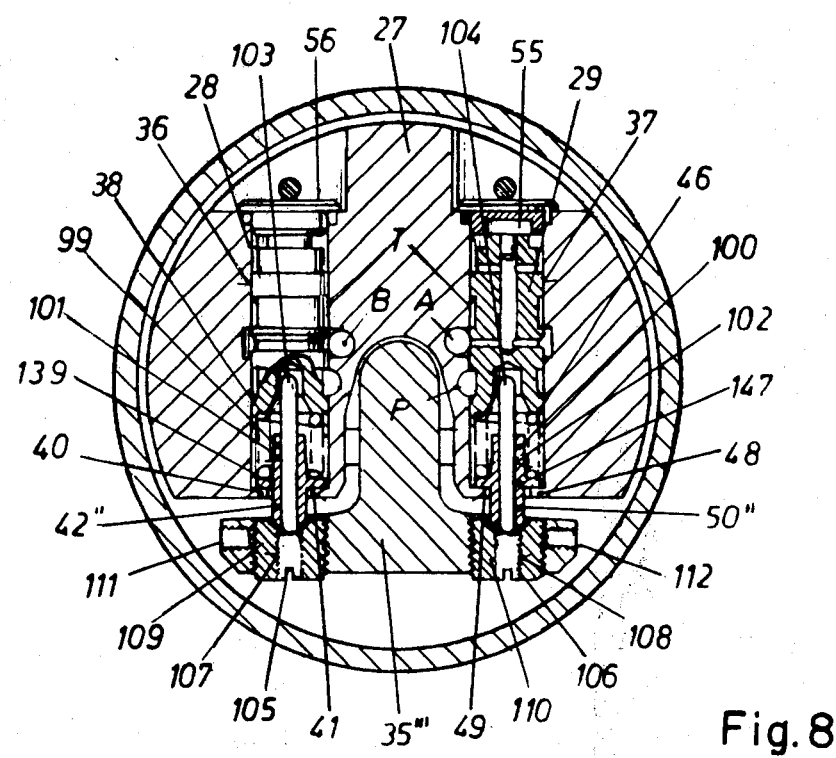
Fig. 8
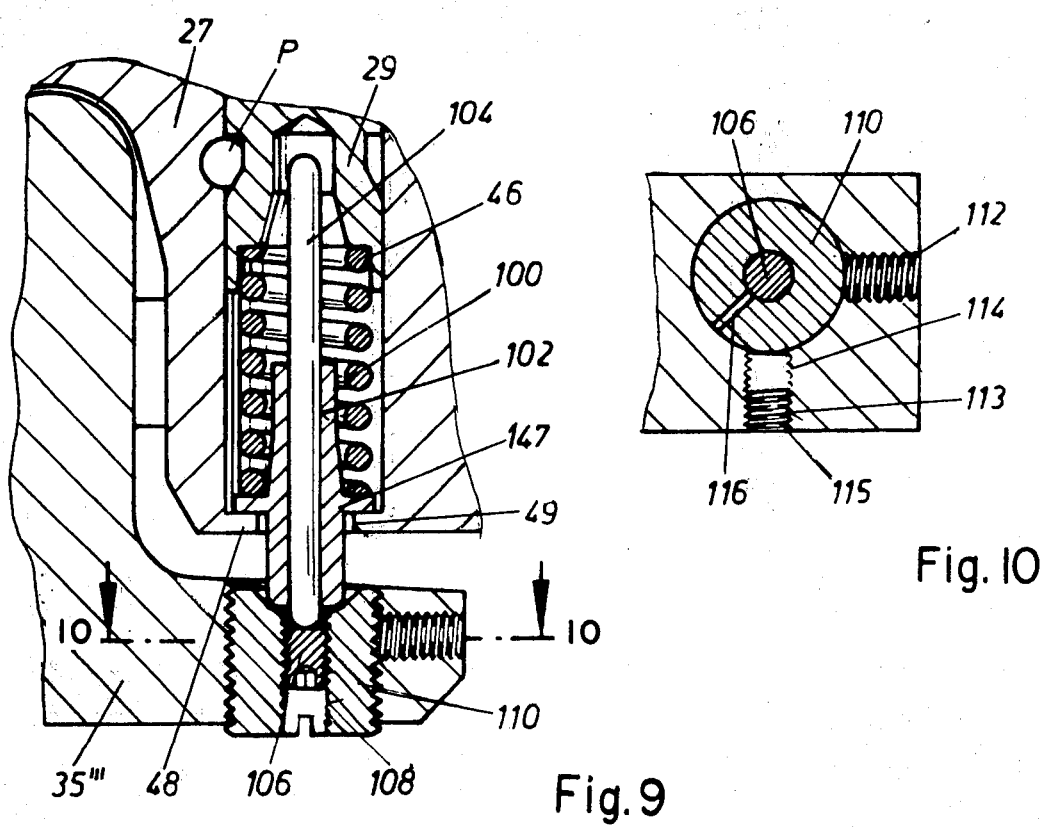
Fig. 9
Fig. 10

PRESSURE FOLLOW-UP CONTROL MEANS FOR SERVO-STEERING SYSTEMS, AND THE LIKE

BACKGROUND OF THE INVENTION

The instant invention concerns a pressure follow-up control system for servo-steering systems, and the like, having two control valves for the purposes of interchangeably connecting the working chambers of a hydraulic servo-motor with either a pressure source or an outlet, or outflow, as well as with a mechanical restoring mechanism for return movement of the servo motor, and passing an indication of pressures which exist in the working chambers to the activating member via the reaction areas stressed by these pressures to the control members of the control valves, or reaction areas, and to the reaction members which are in operative connection with the control members, whereby the control valves are operated by means of a common activating member. By this arrangement, the control valves each from the pressure of the working chamber represent pressure regulating valves which are guided, against the force of a regulating spring, with the help of reaction areas, and are of such a type which, below a predetermined pressure, produce a connection from the pressure source to the working chamber, or, when this pressure exceeds the predetermined limit, said pressure-regulating valves will increasingly throttle this connection, and finally block the same, and will open a connection from the working chamber to the outflow when the pressure increases further, whereby the regulating spring supports itself on the common activating member, according to U.S. Pat. application Ser. No. 391,272, filed Aug. 24, 1973 now U.S. Pat. No. 3,927,602.

Pressure follow-up control systems of this type serve the purpose of retaining a minimum of pressure in the working chambers of the servo motor without a substantial consumption of pressure. This means that the regulating springs are prestressed at least in the center position of the vehicle wheels. During operation, there will result a gradually-increasing reaction force as a result of a further stressing of a regulating spring, and there will result a pressure in the respective working chamber, which pressure is proportional to this stress. In this manner, there is obtained a certain amount of initial pressure in the working chambers, whereas "jerky" motions in the steering and associated noise-formation are avoided. It is, however, heretofore been impossible to fulfill certain requirements which are placed on modern servo steering systems. One of the most important requirements demands is a power-transmission from the driver of the vehicle to the steering wheels without servo support up to an operating force limit. One considers thereby that in certain operational conditions of a vehicle, for example during fast driving on super highways, or on icy roads, the operational forces, which are not great in any event, would be reduced even more during direct-operating servo-support, and the feeling of driving, which is considered as essential, would be lost. On the other hand, the servo support should start as smoothly as possible after overcoming the operating force limit, and the operating force should remain constant above a second force-limit in the sense of a steering power limitation, or at least should increase only very slightly.

In common servo steering systems, in order to obtain these goals, prestressed mechanical transmitting elements are mounted in the powerflow between an activating member and the valve housing which contains the control valves. The relative movements between the activating member and valve housing which are necessary for activating the control valves are able to become effective only after overcoming the prestressing of the transmitting elements, which are conventionally constructed in the form of some type of springs. Up until this point, however, there takes place a purely mechanical power transmission from the driver of the vehicle to the steered wheels. The disadvantage of this arrangement is in that the transmitting elements require an additional mounting space and result in undesirable costs. Additionally, it has not been possible, up to this time, to provide for smooth functioning with acceptable costs, after having overcome the prestress.

SUMMARY OF THE INVENTION

It has now been found that the desired steering characteristics is obtainable in an unexpectedly simple manner with small additional expenditures and practically with an equal amount of mounting space required by means of a design of the pressure follow-up control system according to the present invention. The structure, or design, consists in that the regulating springs of the pressure-regulating valves are prestressed at least in that position which blocks the connections, whereby these springs, with their free ends, support themselves directly, or via spring plates, etc., above an operating force limit which affects the same, only at the activating member or a section which is fixedly connected therewith. In this manner, the entire spring force is accepted by the activating member alone, while below the operating force limit at least one part of the spring force is supported on the control valve housing, or a part fixedly connected therewith, in such a manner so that this part — based on the operating power limitation — increases when the operating power is reduced, and reaches a maximum when the power-flow between the activating member and the regulating spring is interrupted.

As already mentioned above, the regulating springs were previously provided with a prestress, or initial stress, and are supported thereby basically on the activator member, so that this, in the center position of the control member, is accepted as movement of rotation, or power comparator, in the balance. A deflection from the center position was possible with a power output starting from zero. A relaxing of one regulator spring complies with the stressing of another, and vise versa. In accordance with the instant invention, the regulator springs are contained in the control valve housing. A control member can only be deflected via the activating member when the prestressing of the corresponding regulator spring has been overcome. The other regulator spring looses then any contact with the activating member and will no longer influence the first regulator spring. Up to the moment when the prestressing is overcome, the system regulator-spring/control-member fluid head under pressure in the reaction chamber is to be seen as a mechanical-hydraulic lever system which enables a direct power transmission from the activating member to the control-valve housing. It is therefore possible to move the servo motor, together with the steered wheels, without servo support. The amount of pressure which is to be either supplied or removed by means of the change in the working chamber is able to flow through the control valves, since the pressure differences which develop in the working chambers will suffice to move the control members, via the reaction areas, into the correct position. Additional advantages and characteristics of the instant invention may be seen from the disclosure and the dependent claims.

BRIEF DESCRIPTION OF THE DRAWINGS

The disclosure is made by means of the embodiments, shown in the drawings, whereby:

FIG. 4 shows a section taken generally along the line 4—4 of FIG. 3;

FIG. 5 is a schematic illustration of two coaxially-arranged translatorily moved control members;

FIG. 8 shows an arrangement similar to that shown in FIG. 4, but having means for regulating the play between an activating member and a control member;

FIG. 9 shows an enlarged fragmentary section taken from FIG. 8; and

FIG. 10 shows a section taken vertical to the axis of the set screw on line 10—10 of FIG. 9.

DETAILED DESCRIPTION OF THE DRAWINGS

Figure 1:
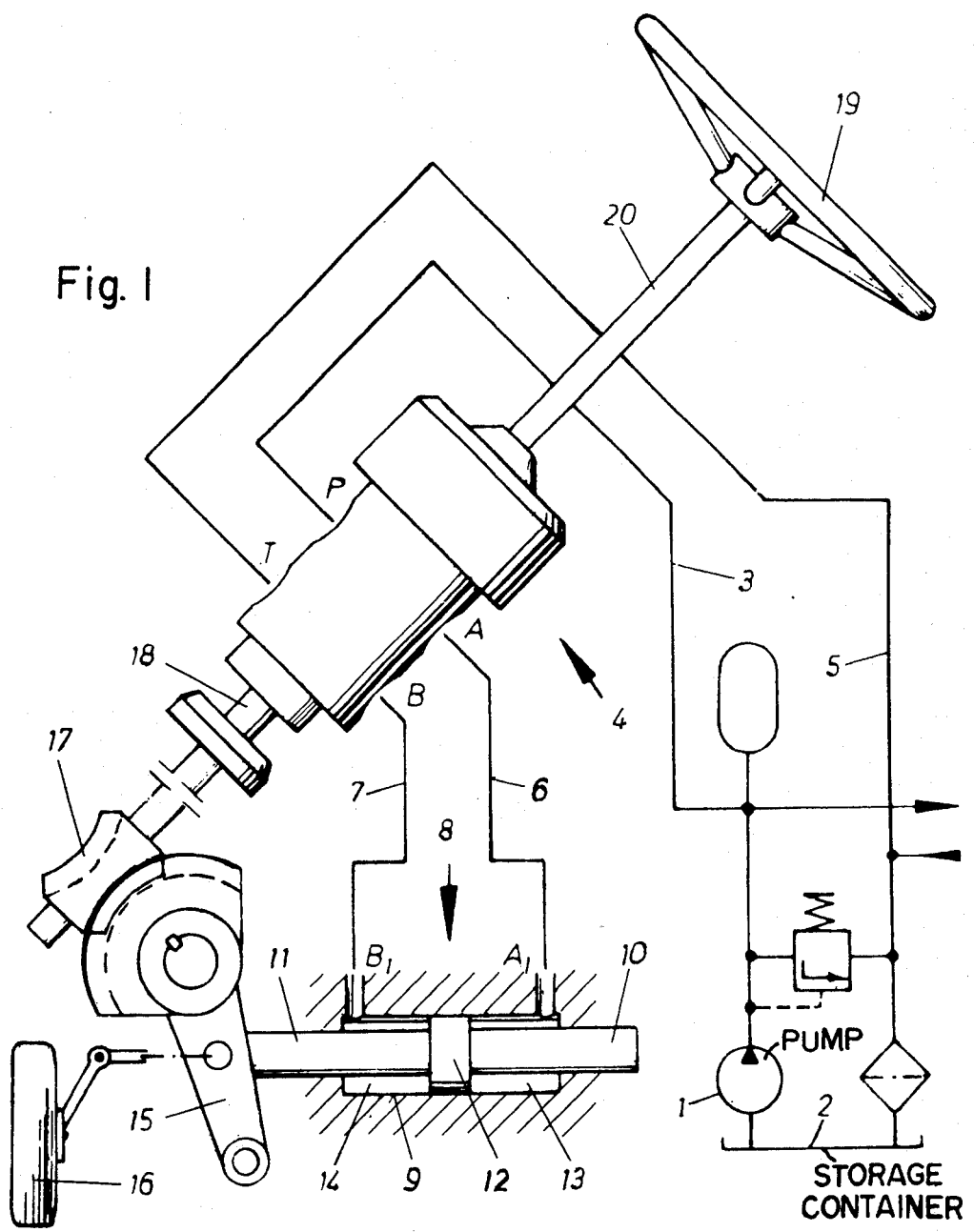
FIG. 1 is a schematic view of a servo steering system according to the present invention.

A pump 1, in FIG. 1, sucks fluid from a storage container 2 and conveys fluid pressure into a pressure pipe 3. The pressure pipe 3 leads to a connection P of a control valve 4, which is provided with additional connections A, B and T. The connection T is connected to an outflow pipe 5, while connections A and B are connected with pipes 6 and 7, which respectively lead to the connections $A_1$ and $B_1$ of a servo motor 8. The servo motor 8 is provided with a piston 12 connected with bilateral piston rods 10 and 11. The piston rods 10 and 11 are surrounded inside cylinder 9 by working chambers 13 and 14. The piston rod 11 is connected to a gear member 15 which affects the steered wheels 16 in a manner not shown in detail. The gear member 15 engages a further gear member 17 which is connected with a valve member 18 arranged inside the control valve 4 and guided from there to protrude outwardly a short distance. A steering wheel 19 affects an operating member 21 by means of steering shaft 20 (shown in detail in FIG. 3). The control valve 4 is provided with a terminal member 22 in which are arranged the connections P, A, B and T, advantageously in the form of threaded pipe unions. In a central bore 23 of the terminal member 22 is arranged a sleeve 24 which, in its outer and inner surface is provided with annular channels which are provided with transverse bores and connected with the above-mentioned connections by means of additional channels. In the inner bore 25 of the sleeve 24 is guided a shaft-shaped section 26 of the valve means 18.

The shaft-shaped section 26 extends beyond both sides of the connecting member 22. At one side, there is provided a possible connection for the gear member 17, while on the other side the shaft-shaped section 26 merges into a valve housing 27. Control pistons 28 and 29 are arranged perpendicular to the axis of the valve member and off-center in the valve housing 27 in a manner shown in detail in FIG. 4. The supplying of pressure to the control piston, or the removal of pressure therefrom, is performed by means of longitudinal and vertical bores provided in the valve member 18, which bores are not shown. These bores terminate in the outer surface area of the section 26 in such a manner that they are connected with the connections P, A, B, and T by means of annular tee-slots and transverse bores in the sleeve 24. For reasons of convenience, the reference numerals of the connection elements are repeated in FIG. 4. The valve housing 27 is surrounded by a pot-shaped cover means 30, which is tightly mounted on the connection member 22. On its bottom section 31, the cover 30 is provided with a bore 32 which is sealingly penetrated by the activating member 21. The operating or activating member 21 is positioned within the valve member 18 by means of two bearing points 33 and 34. The activating member 21 is provided with a lever 35 in the area of the control pistons 28 and 29, which lever 35 runs vertical to the axial direction of section or member 26. The control pistons 28 and 29 slide into bores 36 and 37 provided within the valve housing 27. A regulator spring 38, which faces the front area of the control piston 28, affects the lever 35 and supports itself on a spring plate 39. The spring plate 39 bears on a projection piece 40 arranged between the bore 36 and a bore 41 of a smaller diameter than bore 36. The spring plate 39 is provided with a pivotal projection 42 which penetrates the bore 41, and which comes into contact with a set screw 43 disposed in lever 35. A push rod 44, which is connected with the spring plate 39, extends with a certain amount of play into a countersink 45 provided within control piston 28. A regulator spring 46, which supports itself on a spring plate 47, effects in an analogous manner the front area of the control piston 29 which faces the lever 35. The spring plate 47 bears on a projecting piece 48 disposed between the bore 37 and a bore 49 having a smaller diameter than bore 37.

The spring plate 47 has a pivotal extension 50 (FIGS. 3 and 4), which comes in contact with a set screw 51 disposed in lever 35. A push rod 52, which is connected to spring plate 47, extends with axial play into a countersink 53 provided in control piston 29. The connection A is in permanent communication with a reaction chamber 55 which is located adjacent the other front area of the control piston 29. An analogous arrangement exists between the connection B and a reaction chamber 56 which is located frontally adjacent the control piston 28. In the center position of lever 35, and assuming connection P is biased by a predetermined pressure, control piston 28 assumes a position in which a shoulder 57 of piston 28 separates an annular groove, or ring-nut, 58, which communicates with connection B in the bore 36, from two annular grooves 59 to 60 arranged at both sides of shoulder 57.

Annular groove 59 is in permanent communication with connection P, while annular groove 60 is in permanent communication with connection T. Correspondingly, control piston 29 is provided with a shoulder 61 which separates, in the center position of lever 35 or control piston 29, an annular groove 62 provided in bore 37 from two annular grooves 63 and 64 which are arranged adjacent shoulder 61. Annular groove 64 is in constant communication with connection T.

In order to explain the operation of the embodiment shown in FIGS. 1–4, it should be assumed that lever 35 is initially in the center position, as illustrated in FIG. 4, and that no outside force influences steering wheel 19 or steered wheels 16. Before pressure is supplied by the pump 1, the control pistons 28 and 29 are moved, by means of regulator springs 38 and 46, into a position in which connections A and B are communicating with connection P. As soon as pump 1 begins to deliver pressure, there results a pressure increase which passes from connection P via the connections A and B, conduits 6 and 7, and the connections $A_1$ and $B_1$ up into the working chambers 13 and 14. Since the effective volumes of working chambers 13 and 14 are identical, piston 12 will not move. The pressure increase will continue further from the connections A and B, through the channels 54, which cross through the inside of the control pistons 28 and 29, and into reaction chambers 55 and 56. As soon as the pressure in the latter becomes so great that the force of pressure exerted on control pistons 28 and 29 overcomes the initial biasing of the regulator springs 38 and 46, the control pistons 28 and 29 move against compression of the regulator springs 39 and 46, a predetermined extent until shoulders 57 and 61 interrupt the communication of connection P with connections A and B, or throttles the same, to such an extent, that any just still possibly occuring leak-losses can be fed through connection P. In working areas 13 and 14, as well as in reaction chambers 55 and 56, there develops thereby a pressure which is dependent on the initial biasing of the regulator springs 38 and 46.

For a further explanation, it should also be assumed that a clockwise movement of steering wheel 19 may correspond with a movement of gear section 15 towards the right, as seen in FIG. 1. Additionally, the forces $K_R$ (FIG. 2) which develop on the steered wheels 16 during a steering process should be relatively small, as they appear in, for example, during high speed driving on an express-way or on icy roads. If, under these assumptions, the steering wheel 19 is turned clockwise in FIG. 1, then also lever 35 will turn clockwise and will affect thereby, with a certain predetermined force, the pivotal projection 42 of spring plate 39 via setting screw 43. This force, however, will initially not be sufficient to overcome the initial stress of the associated regulator spring 38, so that a force-transmission is made via the regulator spring 38, the control piston 28, and the pressure-cushion in the reaction chamber 56, to the valve housing 27. The valve housing 27 therefore rotates synchronously with lever 35, also in the clockwise direction, and transmits this movement to gear member 17, which in turn moves gear member 15 towards the right in FIG. 1. Gear member 15 effects, on one hand, a corresponding turn of the steered wheels 16, and, on the other hand, effects a movement of piston 12. The working space 13 is thereby reduced due to a displacement of pressure. This displacement is made in such a manner that the small pressure-increase in the working space 13, which is caused by the movement of piston 12, spreads into the reaction chamber 55 and effects therein a correspondingly increased force on the control piston 29. This increase in force is sufficient to move the control piston 29, under a very low compression of regulator spring 46, in such a manner that a connection from connector A to connector T is produced and pressure is able to flow out of working space 13.

Figure 2:
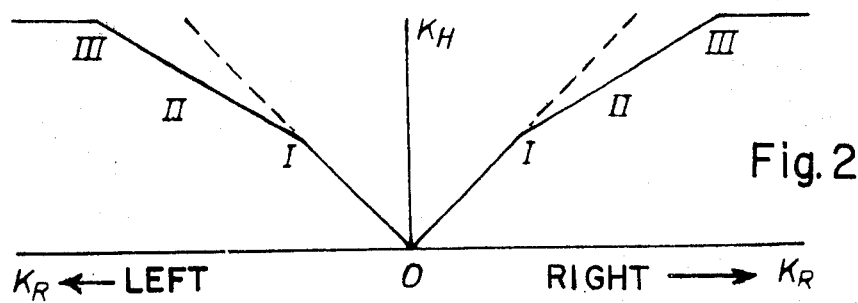
FIG. 2 shows the characteristic curve illustrating force to be exerted on a steering wheel via the force required for the operation of the steering.

In the reverse manner, working space 14 increases due to the production of a pressure reduction in working space 14 and in the reaction chamber 56 connected with working space 14. The diminishing force on control piston 28, which results from this pressure-reduction, enables regulator spring 38 to push control piston 28 into a position in which pressure is able to flow in a sufficient amount from the connection P to the connection B. It may be seen from this process, that even though pressure is flowing from connection P to connection B, there does not take place a servo support. Rather, there results, the movement of steered wheels 16 and of piston 12 solely by means of manual force $K_H$ expended on steering wheel 19. This process is shown in FIG. 2 by the curve line O-I.

Now, we shall assume that the force which is required to turn the wheels 16 is greater than that required in the above-described example, as may be the case during driving at low speed on tight curves or on a soft road surface. The pressure in the reaction chamber 56 will then no longer be sufficient to transmit the required force; i.e., the pressure cushion in the reaction chamber 56 can no longer be viewed as inflexible. During a clockwise movement of lever 35 above a force-limit which corresponds with point I in FIG. 2, therefore, spring plate 39 is lifted from projection 14. Regulator spring 38 is therefore stressed somewhat higher, and has the tendency to move control piston 28 in a manner so that shoulder 57 produces a connection between the connections P and B. In this condition, it should be noted that even though a relative movement between lever 35 and valve housing 27 has taken place, there has not occurred a relative movement between the valve housing 27 and the connecting member 22.

It is only when the pressure which flows from connection P into connection B, and from there into working chamber 14 and causes therein a pressure increase which is sufficient for moving piston 12, and therewith gear member 15, to the right, that an impact is made on steered wheels 16. A mechanical return-guiding of this movement is simultaneously made via gear member 17; i.e., valve member 18, and therewith a valve housing 27, follow the movement of the lever 35 always in a manner so that shoulder 57, after lever 35 has completed its movement, interrupts again the connection between the connections P and B. The force affecting the steering wheels 16 during this operational stage comprises two parts. One part corresponds with the auxiliary force generated by the servo-motor B, while the other part again is transmitted from lever 35 via the regulating spring 38, the control piston 28, and the pressure cushion in the reaction chamber 56 to the valve housing 27, and hence corresponds to the respective stress of the spring 38. This operational behaviour corresponds to the line I-II of FIG. 2. It is recognized that this line I-II runs more horizontal or level than the line O-I the more level course corresponds with the saving on manual force, or power, realized by means of the gradually starting servo support. The outflow of pressure from the reduced working chamber 13 is also made here in the same manner as already described above.

Since the contact between set screw 51 and projection 50 of spring plate 47 is released during a rotation of lever 35 relative to valve housing 27, a minute movement of control piston 29 will in no way influence the control piston 28. Since, however, on the other hand, the regulator spring 46 remains under stress, there will be retained in working chamber 13 in any case a certain amount of initial pressure. After a certain shortening of regulator spring 38, there finally results a mechanical contact between push rod 44 and control piston 28, and this contact may correspond with point II of FIG. 2. From this point on, naturally, there cannot take place a further compression of the regulator spring 38. Under the assumption that after a further predetermined power-increase there may begin a power-steering limitation (not described in detail at this point), the curvature, after proceeding through line II-III, will assume a line which is substantially parallel to the abscissa O-$K_R$. Power-steering limitations are already known in various embodiments, and are based in general on the fact that the pressure in the reaction chambers 55, 56 remains constant, whilst pressure in the corresponding working chamber increases further. Therefore, no further detailed explanation in this connection is considered necessary at this point.

*results

The incline of line II-III is identical to that of line I-II, so that there results a continuous curve line I-III. The incline of the line I-III, ignoring the levers which appear in the steering kinematics, depends mainly on the condition of the effective, or operative, volumes of reaction chamber 56 or working chamber 14. The smaller the effective, or operative, volume of the reaction chamber 56, the larger will be the hydraulic translation and the more even will be the curve line I-III. The return flow of pressure from working chamber 13 is here also made in the above-described manner. The same return-flow effect is produced in the case where the steering wheel 19 is released and the steered wheels 16 will tend to straighten themselves out. Also in this case, an automatic return to the original position of the wheels 16 with a corresponding displacement, or resuctioning, of pressure in the system is possible. During a turning of steering wheel 19 counter-clockwise, as seen in FIG. 1, the entire processes described above occur in the reverse manner based on the control piston 29. With the assistance of set screws 43 and 51, it is possible to adjust the lever 35 symmetrically to the valve housing 27. It is furthermore possible, in view of projections 42 and 50, to set a predetermined play, an ease of play, or even a predetermined initial stress in the system.

FIG. 5 shows a valve housing 27' in which are arranged two coaxial bores 36' and 37', between which is located a bore 65 having a smaller diameter than bores 36' and 37'. Into this bore 65 slides an activating member 35', which, in a manner not shown in detail, is in operational communication with a steering wheel 19'. The activating member 35' affects bilaterally when in a center position spring plates 39' and 47' which contact reductions 40' and 48' disposed between bores 36' and 37'.

A regulator spring 38' bears on the spring plate 39', whereby regulator spring 38' affects one frontal area of a control piston 28'. The control piston 28' is provided with three shoulders 66, 67, and 68 which are separated from each other by means of reduced shank diameters 69 and 70. In a center position, the shoulder 67 closes an annular slot 71 into which terminates a connection B'. Into the area of annular spaces 72 and 73, which surround the reduced shank diameters 69 and 70, terminates a connection T', as well as a connection P'. The latter is connected with a pressure source 1' by means of a pipe 74. An outflow pipe 75 is connected with connection T'. A pipe 76 leads from connection B' to a connection B'$_1$ of a servo motor 8', which contains a cylinder 9', a piston 12' with bylateral piston rods 10' and 11', as well as working chambers 13' and 14'.

The spring plate 47' is affected by a regulator spring 46' which biases a control piston 29'. The control piston 29' is provided with shoulders 77, 78, and 79. In the center position of piston 29, shoulder 78 blocks an annular groove 80, into which terminates a connection A' connected to a connection A'$_1$ by means of a pipe 81, whereby connection A'$_1$ terminates into working space 13'. The shoulders 77, 78, and 79 are separated from each other by means of reduced diameter shanks 82 and 83.

Connection P', which is also connected with the pressure source 1' by means of pressure pipe 85, terminates into an annular space 84 which surrounds reduced diameter shank 82. A connection T' leads from an annular space 86, which surrounds the reduced diameter shank 83, to an outflow pipe 87. A control pipe 88 branches off from the pipe 76, and leads to a reaction chamber 89 which is adjacent shoulder 66.

In a similar manner, pipe 81 is connected by means of a control pipe 90 with a reaction chamber 91 which is frontally adjacent the shoulder 79. Valve housing 27' is in operational communciation with the piston rod 11' by means of a gear member 92, which is only schematically illustrated.

Figure 3:
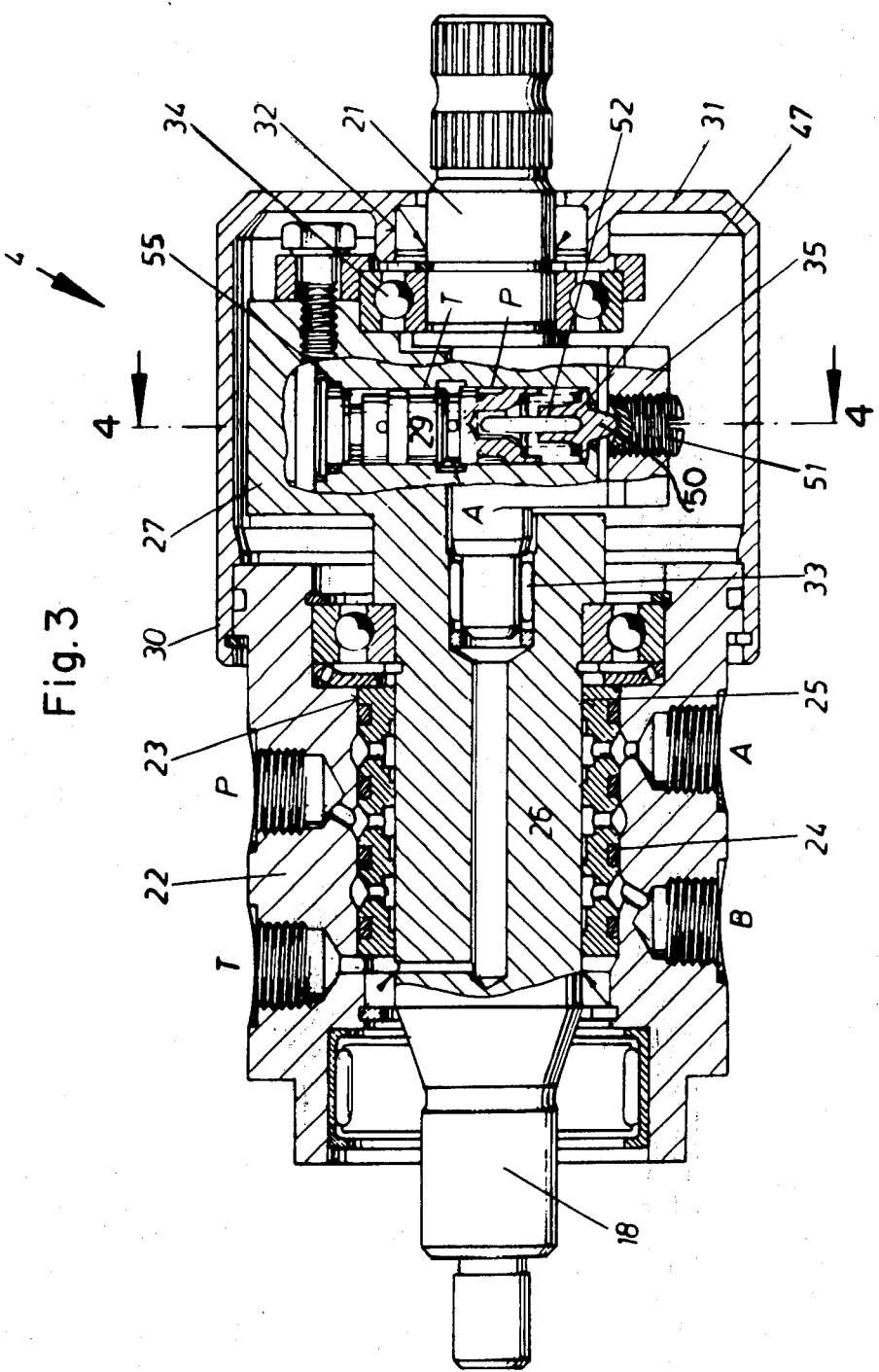
FIG. 3 shows a section taken generally along the axis of the control valve of FIG. 1.

The operation of the embodiment is very similar to the embodiment of FIGS. 3 and 4. An activation of the steering wheel 19' clockwise, as seen in FIG. 5, may correspond with a movement of activating member 35' to the left in FIG. 5.

Up to the moment when the initial stress of the regulator spring 38' has been overcome, there will be a direct flow of power from the steering wheel 19', via the activator member 35', the spring plate 39', the regulator spring 38', the control piston 28', as well as the pressure cushion in reaction chamber 89, to the valve housing 27', and from there, via the drive train 92 and the piston rod 11', etc., to the steered vehicle wheels 16'. Pressure is forced out of the decreasing working space 13', which forced-out pressure causes a pressure-increase in the reaction chamber 91 and moves thereby control piston 29' into a position in which connection A' is connected with connection T'. In the reverse, the pressure reduction in the increasing working space 14' will also cause a pressure reduction in the reaction chamber 89, whereby the regulator spring 38' is able to move the control piston into a position which will release the connection of P' and B'. This process again corresponds with the curvature line O-I of FIG. 2. At an increasing power-requirement, the initial bias of regulator spring 38' is overcome and spring plate 39' is lifted from its support. Since, as above mentioned, control pistons 28' and 29' change their position only by a small amount, there results a steering process at an increasing power-requirement under increasing compression and thereby at a higher initial bias of the regulator spring 38'. The contact between the spring plate 47' and the activator member 35' is thereby lost. The steering characteristics correspond thereby with the curvature I-II. During the exceeding of a further power-limit, there finally takes place a mechanical contact between spring plate 39' and control piston 28'. From this point on, the characteristic curve corresponds again with the line II-III. The pressure moves thereby from connection P' to connection B' and from there, via the pipe 78 as well as the connection B'$_1$ into working space 14' and biases therein piston 12', in the sense of the servo-support. The outflow from the working space 13' takes place in a manner as already described above. The same procedure results also at an automatic return, or straightening, of the steered wheels 16'.

Figure 6:
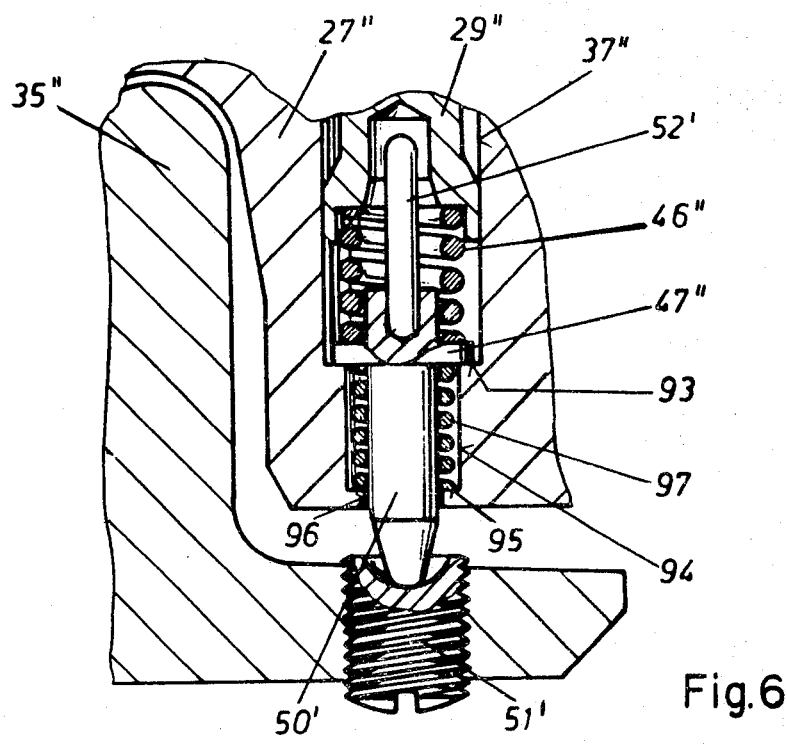
FIG. 6 is an enlarged fragmentary sectional view of a variation of the support for the regulator spring.

In some instances, there exists a requirement that in spite of a relatively high initial pressure in the working spaces 13', 14' of the servo motor, the amount of power which is to be manually transmitted before the beginning of the servo support should be low. In other words, the manual power which is necessary for overcoming the initial bias of the regulator spring should be lower than the initial stress of the regulator spring. FIG. 6 shows a solution to this problem.

In a valve housing 27" is arranged a bore 37" which decreases into a coaxial bore 94 via a sharp-edged piece 93. Adjacent to the coaxial bore 94 is a bore 96 of a smaller diameter and which is outwardly directed via reduction piece 95. A control piston 29", which is stressed by a regulator spring 46", glides into the bore 37". The regulator spring 46" is supporting itself on a spring plate 47". The spring plate 47" abuts in its initial position on the reduction piece 93 and is fixedly connected with a projection piece 50' which penetrates, with radial play, the bores 94 and 96 and affects a setting, or adjustment, screw 51' arranged within a lever 35". A push rod 52' is connected with the spring plate 47", which push rod, after a certain relative movement between the spring plate 47" and the control piston 29", comes into mechanical contact with piston 29". Between the bottom side of the spring plate 47" and the reduction piece 95 is arranged an auxiliary spring 97 having an initial stress in the illustrated position which is power than the initial stress of the regulator spring 46".

The operation of this embodiment is as follows:

The force produced by the regulator spring 46" affects only partially the reduction piece 93 or the adjusting screw 51'. A further force component, which is determinable in its size by means of a suitable selection of the auxiliary spring 97, is transmittable to the reduction piece 95 by means of said auxiliary spring 97. The auxiliary spring 97 thus functions in the same direction as the activating force and reduces accordingly the activating force which is required for lifting the spring plate 47" off the reduction piece 93 by the amount of its initial deflection. This manner of operation has in certain cases of application also the advantage that after the lifting of the spring plate 47", the spring constants of the regulator spring 46" and the auxiliary spring 97 are added, so that there results a higher spring constant for the system. With the help of these increased spring constants, there can be obtained a relatively high increase of pressure at comparatively low relative movements between the lever 35" and the valve housing 27". In this manner, under certain conditions, the feeling of a "gap" in the steering can be avoided.

Figure 7:
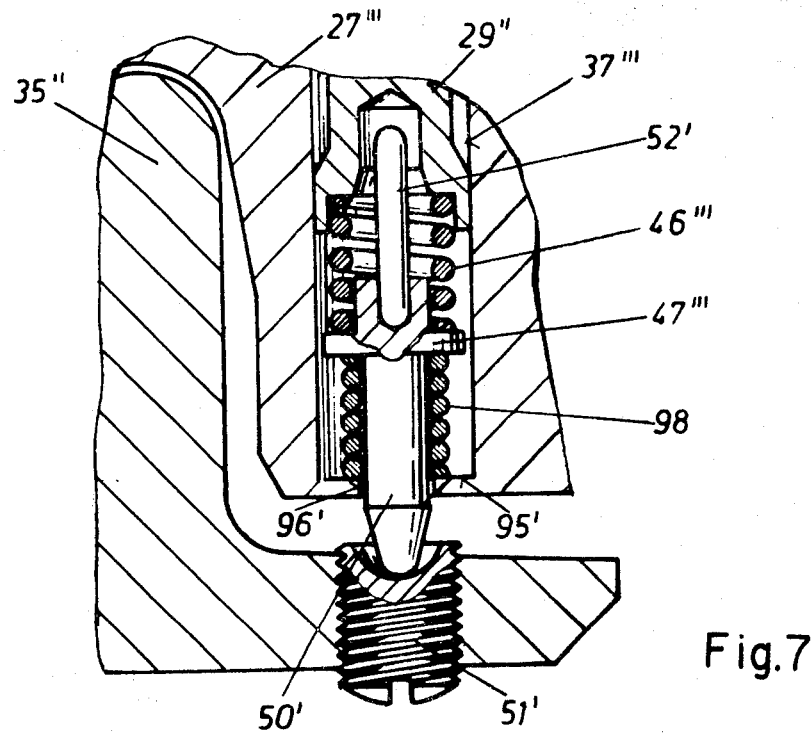
FIG. 7 is an enlarged fragmentary sectional view showing a further embodiment of a support for the regulator spring.

FIG. 7 shows a further possibility for realizing this performance. In a valve housing 27" is arranged a bore 37" which extends via a reduction piece 95' into an outwardly extending bore 96'. A control piston 29" slides in bore 37" under the bias of a regulator spring 46''' which affects control piston 29". Piston 29" supports itself, on the other hand, on a spring plate 47''''. The spring plate 47'''' is stressed on its bottom side by an auxiliary spring 98 which finds its support on a reduction piece 95'. The spring plate 47'''' is fixedly connected with a projection piece 50" which serves for the guidance of the auxiliary spring 98, penetrates the bore 96' and affects an adjusting screw 51' disposed in lever 35". The spring plate 47'''' is furthermore connected with a push rod 52' which, after a predetermined relative movement between spring plate 47'''' and control piston 29", comes into mechanical contact with piston 29".

In order to explain the operation of this embodiment, it may be assumed that the spring constant of the auxiliary spring 98 is measured in a manner so that the auxiliary spring 98 in the center position of the control piston 29" is pushed to "block" mode by means of the then developing initial stress of the regulator spring 46''', and thereby is equal to a fixed support. Of course, the auxiliary spring 98 must be so constructed that there develops no excess stress. The force produced by the regulator spring 46''' in the center position is thereby also supported against the reduction piece 95' via the spring plate 47'''' and the auxiliary spring 98, and possibly via the projection 50' also on the adjusting screw 51'. It is necessary to manually produce that force component by which the force affecting the reduction piece 95' exceeds the initial stress of the auxiliary spring 98 which is pushed to block. After this manual force is produced, the auxiliary spring 98 is able to expand, whereby there results again an adition of the spring constants. Also in this case, the initial stress of the regulator spring 46''' may have a relatively high initial pressure. Nevertheless, the manual force which is necessary for the displacement of the control piston 29' can be kept low.

Since an automatic self-straightening of steered wheels is generally required, and therefore the return flow should take place without a substantial pressure increase from the working space which is connected with the outflow, the spring constant of the corresponding regulator spring must be low. A high spring constant would cause an undesirable high pressure increase even in the steering paths of the control piston, which pressure must be kept very small, and would thereby interfere with the automatic return of the steered wheels to a straight, or forward, position. On the other hand, a small spring constant requires a relatively large path between the activating member and the control, or steering, member, after overcoming of the force limit, before the regulator spring is stressed sufficiently that a significant pressure increase can take place. This relatively large path is noticable, for example, on the steering wheel as an undesirable gap. Even though the force which the driver has to produce is steadily increasing, he has, subjectively due to the large path, the feeling of power-requirement which is being reduced gradually. As soon as, however, a mechanical contact taken place between the activating member and the steering member, a pressure increase can be obtained without a nominative path of the activating member. It is, therefore, desired to keep the play between the activating member and the steering member just large enough so that the steering member, after overcoming of the play, will just permit an automatic resetting of the servo motor with a predetermined pressure increase in the respective working space at a predetermined return speed. This optimum cannot be realized without adjustment possibility in practice due to existing manufacturing tolerances.

A simple, inexpensive and easily operable adjusting of the play between the activating member and the steering member is realized by means of the embodiment of FIGS. 8 to 10, whereby adjustment is possible in a continuous manner and independent of the adjustment means. This enables adjustment of the activating member to a symmetrical position relative to the valve member, or to permit a connection between the activating member and the control member which is free of play.

The reference numerals which are utilized in the following disclosure are selected partially on the basis of FIG. 4. The structure of the valve housing 27 as well as the control pistons 28 and 29 is identical to the one described above. Variations to FIG. 4. result in the regulator springs 38 and 46 affecting spring plates 139 and 147, which themselves, at least in a wheelscentered position of the control pistons 28 and 29, are supported on the projecting pieces 40 and 48 provided between the bores 36 and 37, as well as on bores 41 and 49 of smaller diameters than bores 36 and 37. The spring plates 139 and 147 are provided with pivotal projections 42'' and 50'', which penetrate bores 41 and 49, as well as pivotal projections 99 and 100 aligned thereto which extend into the regulator springs 38 and 46. The projections 42'' and 50'' or 99 and 100 are provided with central through-holes, or bolt holes, 101 and 102, which serve for guiding of push rods 103 and 104. The push rods 103 and 104 penetrate the regulator springs 38 and 46 and in a center position are slightly spaced from the control pistons 28 and 29, where they abut with their opposite ends on the screws 105 and 106. The latter are screwed into the threaded bolt-holes 107 and 108 by means of setting, or adjustment, screws 109 and 110. The setting screws 109 and 110 affect the projections 42'' and 50'', and are located in a lever 35''' which serves as an activating member. The lever 35''' is provided with threaded holes 111 and 112, and in staggered arrangement thereto are two further threaded holes, of which one is seen in FIG. 3 and indicated by numeral 113. A preferably synthetic part 114 is inserted into the threaded hole 113 and pressed against the adjusting screw 110 by means of a setscrew 115. The adjusting screw 110 is provided with an axial slit 116. The same construction is, naturally, also proposed for the adjusting screw 109.

The operation of the embodiment of FIGS. 8 to 10 is the same as already described for the embodiment of FIGS. 1 to 4. Thus, it will suffice to described here the operation of the adjustment means alone.

The adjustment is suitably first made, before mounting the unit into a motor vehicle, on a test-stand and without the push rods 103 and 104, the screws 105 and 106, and adjusting screws 109 and 110. The connections A and B are connected with the working spaces of a cylinder. A predetermined pressure is applied at connection B, and thereby certain pressures develop in the working spaces due to the effect of the pressure-regulating valve of the control pistons, which pressures must be measured. With the aid of adjusting screws 109 and 110, efforts are then made to achieve a contact between the projections 42'' and 50'' which is free of play, and that there develops as well a symmetric position of the lever 35''' relative to valve housing 27. The symmetric position is very important as otherwise there could result a contact between lever 35''' and valve housing 27 before a control piston could have made its necessary lift. An undesirable asymmetry in the steering behaviour would be the result. After this adjustment, the setscrews 115 are slightly adjusted whereby at first, depending on the position of the slots 116, one of the threaded holes 111, 112, and 113 is selected. The push rods 103 and 104 are then pushed through the threaded bolt holes 107 and 108 and are adjusted to be free of play, but without stress, relative to the control pistons 28 and 29. Thereafter, the screws 105 and 106 are released by an angle which was previously established by means of a test, so that a play between the control pistons 28 and 29 and the push rods 103 and 104 occurs. This play must suffice for and automatic resetting of the servo motor, which is represented by the cylinder. Hydraulically seen, this means that a predetermined flow of pressure must flow through the connections A-T or B-T, without exceeding a predetermined pressure increase. The cylinder is thus moved by means of outer forces with a certain speed, and the pressure increase is measured in the corresponding working space. If this pressure is too high, then the respective screw is loosened so much until said pressure is reduced to the desired value. Thereafter, the respective setscrew is tightened to such an extent that the screw and adjusting screw are both secured against shifting.

In certain wall-strengths of an adjusting screw, and in so far as aluminum or a similar soft material is used, it has been proven to be possible to obtain an adequate clamping without using a slot. The pressure or force which is produced by means of a setscrew effects thereby a deformation of the wall in such a manner that at the outside as well as the inside there results an increased resistance against a displacement.

The instant invention, of course, is not limited to the illustrated embodiments, but can be applied principally in all types of pressure follow-up control systems in so far as it is constructurally feasible to secure the regulating spring in the valve housing without the possibility of a mutual influence between the spring and housing. The inventive thought is thereby limited neither to the mutual position of the steering, or control, member, nor to its embodiment or the embodiment and points of contact of the activating member. Furthermore, the manner and type in which the relative movements, which are required for the activating of the control members, are produced, does also not matter. In addition, it should be pointed out that the spring force component which develops in the center position of the activating member during a non-existing outer force, can also be determined by means of one adjusting screw. However, in this case, there can develop a certain asymmetric position of the activating member relative to the valve housing, due to imprecise manufacturing.

What is claimed is:

1. In a pressure follow-up control system for servo-steering systems, and the like, comprising, in combination: (a) a fluid servo motor provided with a pair of separated working chambers; (b) a pair of control valves arranged for interchangeably connecting the working chambers of the servo motor with a pressure source and an outflow means, each control valve including a housing; (c) an activating member connected to both of the control valves for operating same, the control valves being connected to the working chambers of the servo motor for sensing pressure in the working chambers and forming pressure-regulating valves having control pistons provided with reaction areas receiving pressure from the working chambers, the valves being arranged for producing a connection between the pressure source and either one of the working chambers when the pressure on the associated reaction area falls below a predetermined value, and for increasingly throttling the connection between the pressure source and either one of the working chambers until the connection is blocked when the pressure in the working chamber increases beyond a predetermined limit, and connect the working chambers to the outflow means when the pressure increases further; and (d) springs arranged in the control valves for regulating same; the improvement in which the springs are prestressed relative to the pressure regulating valve at least in that positions of the valves which block the fluid connections, and the springs are self-supported by ends of the springs being arranged facing the activating member for permitting the entire spring force to be first received by the activating member alone, while below an activating force limit, at least one component of each of the springs is supported by the housing of the control valve, so that the bias on the one component increases, based on the activating force limit during a reduction of the activating force, and reaches a maximum when power-flow between the activating member and the associated regulating spring is interrupted.

2. The pressure follow-up control means according to claim 1, wherein at a center position of the activating member, and in the absence of an outer force, the regulator springs are solely supported on the control valve housing.

3. The pressure follow-up control system according to claim 1, wherein adjusting screws are provided in the control valves for permitting adjustment of a lost-notion operational connection between the activating member and regulating springs.

4. The presssure follow-up control device according to claim 3, characterized in that the adjusting screw is constructed from aluminum and is measured in its wall-strength in a manner permitting a clamping facilitating deformation.

5. The pressure follow-up control system according to claim 3, wherein, with the adjusting screw set for the center position of the activating member, and during the absence of an outer force, a certain component of the force of the regulating spring is received by the activating member.

6. The pressure follow-up control system according to claim 5, wherein after a predetermined reduction of the regulating spring between the activating member and the associated control piston, a mechanical contact takes place, which contact is non-resilient in the operational direction.

7. The pressure follow-up control system according to claim 6, further including spring plates disposed between the ends of the regulating springs ends and the activating member, and wherein an auxiliary spring is arranged for affecting an associated spring plate counter to the force of the associated regulating spring, said auxiliary spring supporting itself on the valve housing and its force being measured in a manner such that in the center position of the associated control piston, and in the absence of outer forces, the spring plate is pushed against a stop member affixed on the valve housing.

8. The pressure follow-up control system according to claim 6, further including spring plates disposed between the ends of the regulating spring ends and the activating member, and wherein an auxiliary spring affects an associated spring plate counter to the force of the associated regulator spring, which auxiliary spring supports itself on the valve housing and is measured in its force in a manner such that in the center position of the control piston, and in the absence of outer forces, said auxiliary spring is pressed to block.

9. The pressure follow-up control device according to claim 1, wherein a setscrew is utilized as a regulator means, said setscrew being provided with a central through-bore having a threading into which is screwed the adjustment screw with an end thereof arranged facing the control piston for contacting a push rod, whereby the push rod serves as a transmittal means.

10. The pressure follow-up control device according to claim 9, wherein the bore is provided with a diameter which is substantially larger than a diameter of the push rod.

11. The pressure follow-up control device according to claim 10, wherein the push rod pentrates the spring plate of the regulator spring and axially penetrates the regulator spring.

12. The pressure follow-up control device according to claim 11, wherein the spring plate is provided with pivotal extensions having central through-bores which serve for guiding the push rod.

13. The pressure follow-up control device according to claim 12, wherein the setscrew is provided with an axial slot in which is arranged an activator portion of at least one clamping screw which is directed transverse to the setting screw.

14. The pressure follow-up control device according to claim 13, wherein two interspaced threaded holes for the clamping screw are provided in the activator member.

15. The pressure follow-up control device according to claim 14, wherein a synthetic piece is arranged between the setscrew and the adjusting screw.

16. The pressure follow-up control device according to claim 3, wherein a setscrew it utilized as a regulator means, said setscrew being provided with a central through-bore having a threading into which is screwed the adjustment screw with an end thereof arranged facing the control piston for contacting a push rod, whereby the push rod serves as a transmittal means.

* * * * *